United States Patent

Van Wyk

[15] 3,658,361

[45] Apr. 25, 1972

[54] MULTI-IMPLEMENT ADAPTER FOR A VEHICLE HITCH

[72] Inventor: Cornelius G. Van Wyk, Route 1, Box 99-B, Pinetown, N.C. 27865

[22] Filed: July 1, 1970

[21] Appl. No.: 51,465

[52] U.S. Cl. ..................280/411 A, 280/476, 172/446, 111/85
[51] Int. Cl. .......................................B62d 53/00
[58] Field of Search ............280/411 R, 411 A, 476; 111/85; 172/451, 446

[56] References Cited

UNITED STATES PATENTS

| | | | |
|---|---|---|---|
| 3,062,563 | 11/1962 | Pearce | 280/461 |
| 3,077,231 | 2/1963 | Hamilton | 172/421 |
| 2,915,130 | 12/1959 | Todd | 172/451 X |
| 2,755,722 | 7/1956 | Fraga | 172/451 X |

Primary Examiner—Leo Friaglia
Attorney—A. Yates Dowell and A. Yates Dowell, Jr.

[57] ABSTRACT

Apparatus for mounting a plurality of earth-working implements on a propelling vehicle having hitch means. The apparatus includes an adapter having means connectable to the vehicle hitch and a plurality of means for accommodating the hitch connections of a plurality of implements.

3 Claims, 5 Drawing Figures

PATENTED APR 25 1972 3,658,361

INVENTOR
CORNELIUS G. VAN WYK

BY
ATTORNEYS

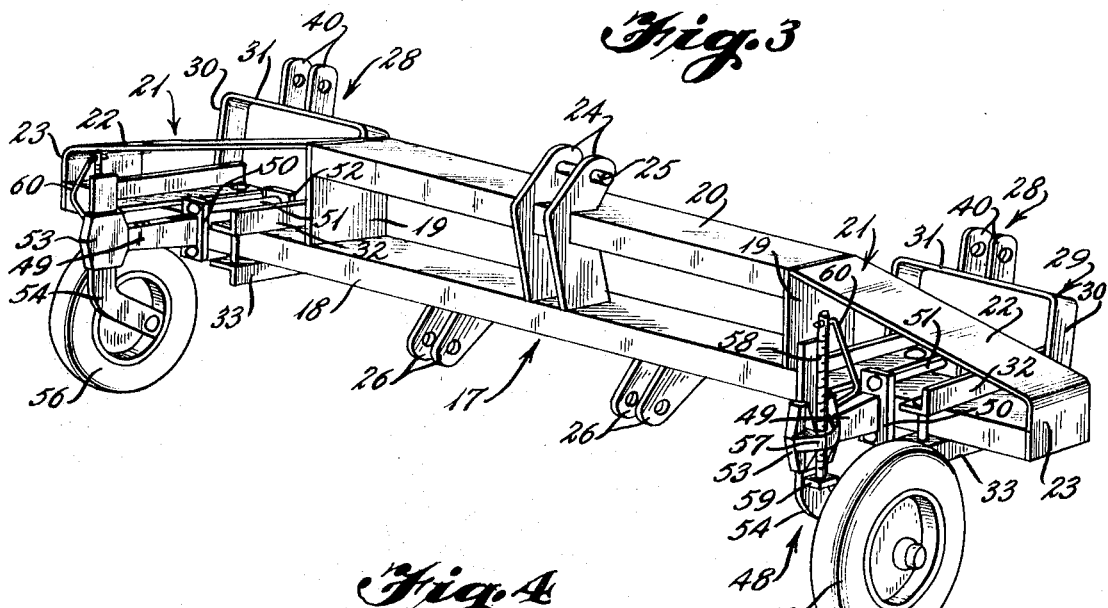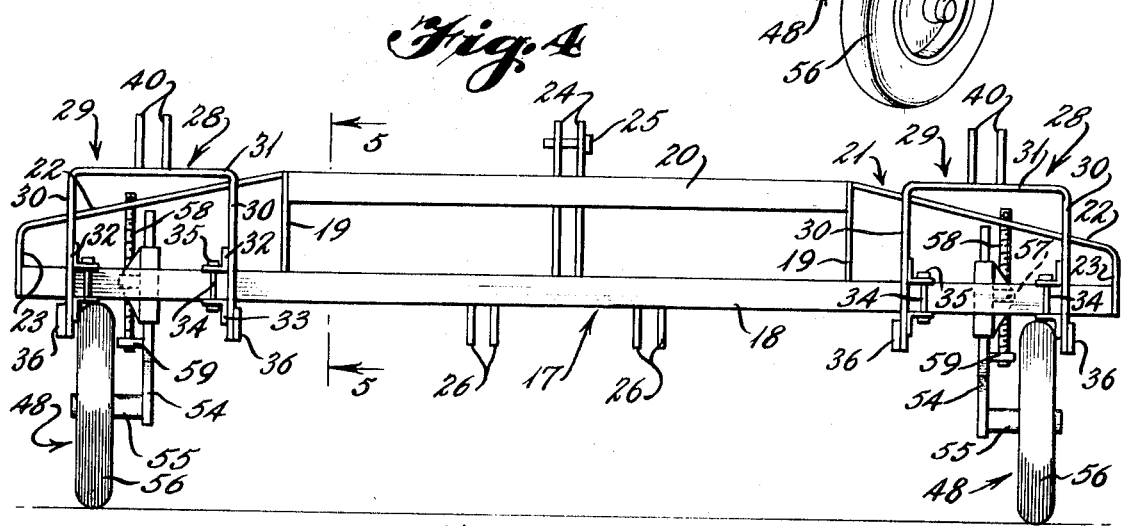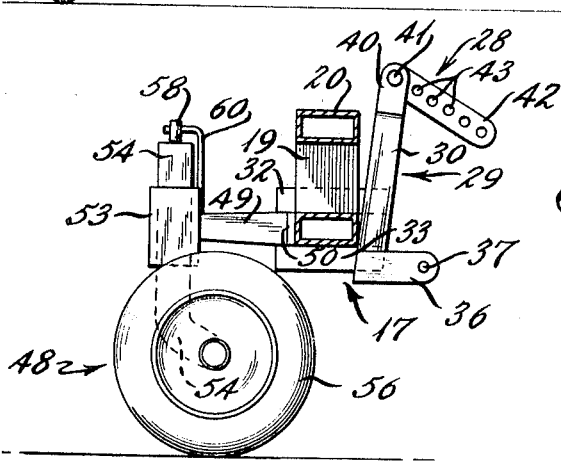

MULTI-IMPLEMENT ADAPTER FOR A VEHICLE HITCH

BACKGROUND OF THE INVENTION

1. Field of the Invention

This invention relates generally to earth-working implements of various kinds and relates particularly to an adapter by means of which a plurality of implements can be mounted on the vehicle hitch.

2. Description of the Prior Art

Heretofore many efforts have been made to connect a plurality of implements to a vehicle hitch; however, these efforts have not been entirely satisfactory since the devices have been complicated, expensive to manufacture and difficult to maintain, have required special mounting means so that they could not accommodate conventional implements, and for other reasons have not served the purpose for which they were intended.

In the past it has been necessary for a farmer to purchase a plurality of implements each of which had a special function in working the soil, and in many instances it has been necessary for a farmer to purchase a plurality of implements which performed the same function but which were used under varying conditions of the soil. As an example, a farmer with a relatively small tractor would purchase a four-row cultivator for use when the soil was damp, and in order to save time and labor the same farmer would purchase an eight-row cultivator for use when the soil was relatively dry. The eight-row cultivator was substantially more expensive than the four-row cultivator, however, the saving in time and labor justified the added expense.

SUMMARY OF THE INVENTION

The present invention is an adapter by means of which a plurality of conventional implements can be mounted on a vehicle hitch to accelerate the preparation of the soil and to reduce the total man hours required, as well as to permit the operator to take advantage of existing weather conditions. The apparatus includes an adapter having means for accommodating a two- or three-point hitch of a propelling vehicle, as well as means for accommodating the hitch connections of a plurality of earth-working implements which may be of similar or entirely different construction and function.

It is an object of the invention to provide a relatively simple adapter by means of which a plurality of conventional implements can be mounted on the hitch of a propelling vehicle in such a manner that the implements can be operated simultaneously.

BRIEF DESCRIPTION OF THE DRAWINGS

FIG. 3 is a perspective of the adapter per se.
FIG. 4 is a front elevation thereof.
FIG. 5 is a section on the line 5—5 of FIG. 4.

DESCRIPTION OF THE PREFERRED EMBODIMENTS

Figure 1:
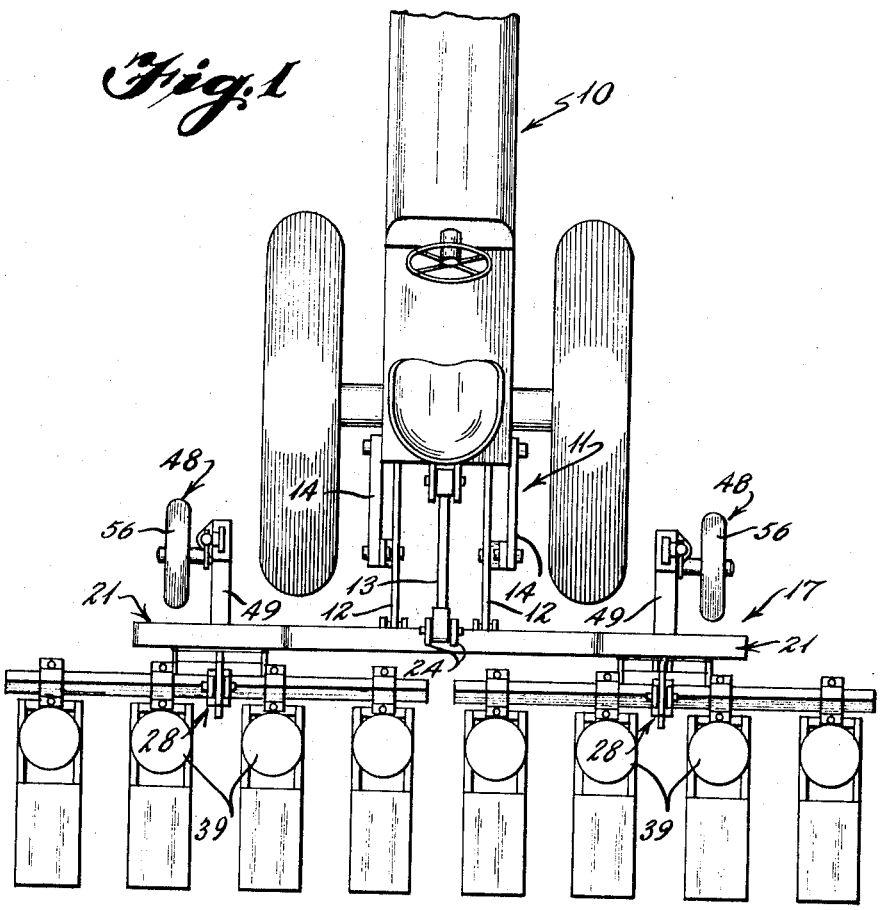
FIG. 1 is a top plan view illustrating application of the invention.
Figure 2:
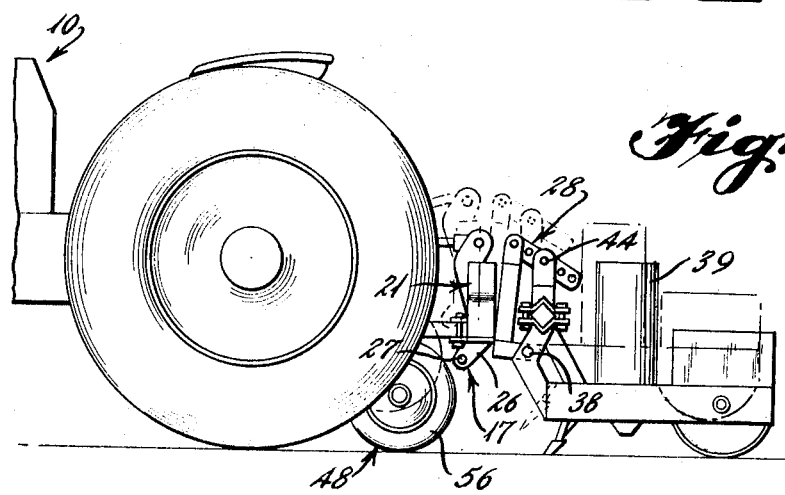
FIG. 2 is a side elevation thereof.

With continued reference to the drawings, a tractor or propelling vehicle 10 is provided having a three-point hitch 11. The hitch includes a pair of generally parallel draft arms 12 and an upper connecting link 13. The draft arms are connected to lift arms 14 by means of which the implement carried by the hitch can be raised or lowered out of and into engagement with the earth. The structure thus far described is conventional and forms no part of the present invention.

When soil conditions are damp, a relatively small earth-working implement such as a four-row cultivator, disk harrow, spring-toothed harrow, sod buster, or the like can be mounted directly on the hitch of the vehicle. The size of the implements is merely illustrative and depends upon the HP rating of the tractor or propelling vehicle.

In order to preclude the necessity of purchasing a relatively large expensive implement in addition to the smaller implement, the present invention was devised to permit the farmer to purchase two smaller implements so that he could use either implement separately or both implements simultaneously. In order to accommodate two implements simultaneously, a relatively strong adapter frame 17 is provided having a body 18 preferably of channel or box construction. A pair of spaced upright supports 19 are mounted on the body 18 and are adapted to support a bridge 20 above the same. The bridge is of channel or box construction for strength with out weight and such bridge is connected to the upright supports 19 in any desired manner, as by welding or the like. A brace 21 is welded or otherwise attached to each of the upright supports 19 opposite the bridge 20 and each of said braces includes an outwardly extending portion 22 and a downwardly extending portion 23 which is welded or otherwise attached to the end of the body 18. The bridge 20 and the braces 21 impart strength and rigidity to the body 18.

The adapter frame normally is disposed generally transversely of the direction of movement of the vehicle and in order to connect the frame to the vehicle hitch, a pair of upstanding lugs 24 are welded or otherwise attached to the body 18 and the bridge 20 substantially centrally of the adapter frame 17. Such lugs are provided with a connecting pin 25 to which the free end of the connecting link 13 is attached. Spaced outwardly from each side of the central lugs 24 are spaced pairs of lugs 26 with each pair adapted to receive a connecting pin 27 by means of which the free ends of the draft arms 12 are connected to the adapter frame 17. The connecting pins 25 and 27 may be of either the category I or category II type depending upon the hitch and the propelling vehicle.

In order to mount a plurality of implements on the adapter frame, multiple implement-mounting frames 28 are adjustably mounted on the body 18 and are adapted to be secured in fixed adjusted position. Each of the mounting frames includes an inverted generally U-shaped body 29 having spaced generally parallel legs 30 connected by a bight portion 31. Each of the legs is provided with upper and lower arms 32 and 33, respectively, which are welded or otherwise attached to such legs and extend forwardly thereof. The arms 32 and 33 are adapted to straddle the body 18. A bolt 34 having a nut 35 connects the forward ends of each pair of upper and lower arms 32 and 33 in such a manner that when the nut 35 is tightened the arms will be drawn toward each other to clampingly engage the body 18 and mount the frames 28 in fixed position. At the lower end of each of the legs 30, a rearwardly extending lug 36 is provided having an opening 37 of a size to receive a connecting pin 38 of an earth-working implement 39.

The upper or bight portion 31 of the body 29 is provided with a pair of upwardly extending lugs 40 connected by a pin 41 to which a connecting link 42 is swingably attached. The link 42 has a plurality of openings 43 adapted to selectively receive the upper connecting pin 44 of the three-point hitch connection of the implement 39. As illustrated one implement-mounting frame 28 is mounted on each end of the body 18 to accommodate two four-row implements; however, it is contemplated that the length of the adapter frame 17 could be increased so that additional mounting frames 28 could be connected to the body 18.

It is desirable to control the depth of penetration of the implements into the earth and this can be done by mounting one or more conventional gauge wheel assemblies 48 on the body 18 so that the hydraulic system of the hitch 11 can be left in neutral position when the device is in operation. As illustrated, each gauge wheel assembly includes an outwardly extending arm 49 having a mounting pad 50 at one end. The mounting pad 50 is adapted to abut the front surface of the body 18 and extend above and below the same. A pair of connectors 51 are mounted in the upper and lower extending portions of the pad 50 and project rearwardly through a pressure plate 52 located in engagement with the rear surface of the body 18. The connectors 51 are adjustably connected to the pressure plate in any desired manner, as by threads, nuts or the like in which the distance between the mounting pads 50 and the pressure plate 52 can be adjusted to apply a force to the body 18 and hold the gauge wheel assembly 48 in fixed position on the body.

At the forward end of the arm 49 an enlargement 53 is provided having a slideway in which a post 54 is slidably received. The lower end of the post is provided with a stub shaft 55 on which a gauge wheel 56 is freely rotatably mounted.

In order to raise and lower the post 54 and thereby vary the distance between the earth and the body 18, a threaded nut 57 is fixed to the enlargement 53 and is adapted to engage a threaded shaft 58. The lower end of the shaft 58 is freely rotatably mounted within a fixed lug 59 carried by post 54. The opposite end of the threaded shaft 58 is provided with a crank 60 for causing rotation of the shaft 58 in either direction. Since the nut 57 is fixed, rotation of the shaft will move the shaft in a vertical direction to cause the post 54 to slide up or down in the slideway in the enlargement 53 and thereby raise or lower the body 18.

I claim:

1. An adapter for connecting a plurality of implements having mounting pins forming three-point hitch connections to a propelling vehicle having a three-point hitch, said adapter comprising an elongated hollow body, at least two spaced generally parallel upright members mounted on said body, bridge means connecting said upright members, said bridge means being in vertically spaced generally parallel relationship to said body, means on said body providing a connection to the three-point hitch of said vehicle, a plurality of implement mounting frames adjustably mounted on said body, each of said implement mounting frames having at least one pair of spaced generally parallel forwardly extending arms adapted to straddle said adapter body, means for securing said arms to said body in fixed adjusted position, a pair of spaced generally parallel rearwardly extending lug means fixed to each of said implement mounting frames, each of said lug means having an opening for receiving one of the lower connecting pins of the implement three-point hitch connection, and link means swingably connected to the upper portion of each of said implement mounting frames, said link means having a plurality of openings for selectively receiving the upper connecting pin of the implement three-point hitch connection, whereby a plurality of implements having three-point hitch connections may be mounted on a propelling vehicle having a three-point hitch.

2. The structure of claim 1 in which each of said implement mounting frames includes an inverted generally U-shaped body.

3. The structure of claim 1 including at least one gauge wheel assembly mounted on said adapter body.

* * * * *